United States Patent [19]
Kalazny

[11] Patent Number: 6,003,935
[45] Date of Patent: Dec. 21, 1999

[54] MODULAR VEHICLE FRAME ASSEMBLY

[75] Inventor: Andrzei J. Kalazny, St. Lawrence, Pa.

[73] Assignee: Dana Corporation, Toledo, Ohio

[21] Appl. No.: 08/774,993

[22] Filed: Dec. 27, 1996

[51] Int. Cl.⁶ .................................................. B62D 25/20
[52] U.S. Cl. ........................................... 296/204; 280/785
[58] Field of Search .................................. 296/197, 203, 296/204, 205; 280/785, 797, 798, 800

[56] References Cited

U.S. PATENT DOCUMENTS

| | | | |
|---|---|---|---|
| 2,837,347 | 6/1958 | Barényi | 280/796 |
| 2,901,266 | 8/1959 | Lindsay | 280/785 |
| 3,873,120 | 3/1975 | Lecomte et al. | 280/785 |
| 4,676,545 | 6/1987 | Bonfilio et al. | 296/197 |
| 5,332,281 | 7/1994 | Janotik et al. | 296/209 |

*Primary Examiner*—Andrew C. Pike
*Attorney, Agent, or Firm*—MacMillan, Sobanski & Todd

[57] ABSTRACT

A modular vehicle frame assembly includes a first generally U-shaped front cradle having a base portion and a pair of spaced apart leg portions extending forwardly from the base portion. A second generally U-shaped front cradle has a base portion and a pair of spaced apart leg portions extending rearwardly from the base portion. The second front cradle is secured to the first front cradle. A pair of axially extending side rails are secured to the leg portions of the second front cradle and extend rearwardly therefrom. A third generally U-shaped rear cradle has a base portion and a pair of spaced apart leg portions extending rearwardly from the base portion. The third rear cradle is secured to the side rails.

9 Claims, 3 Drawing Sheets

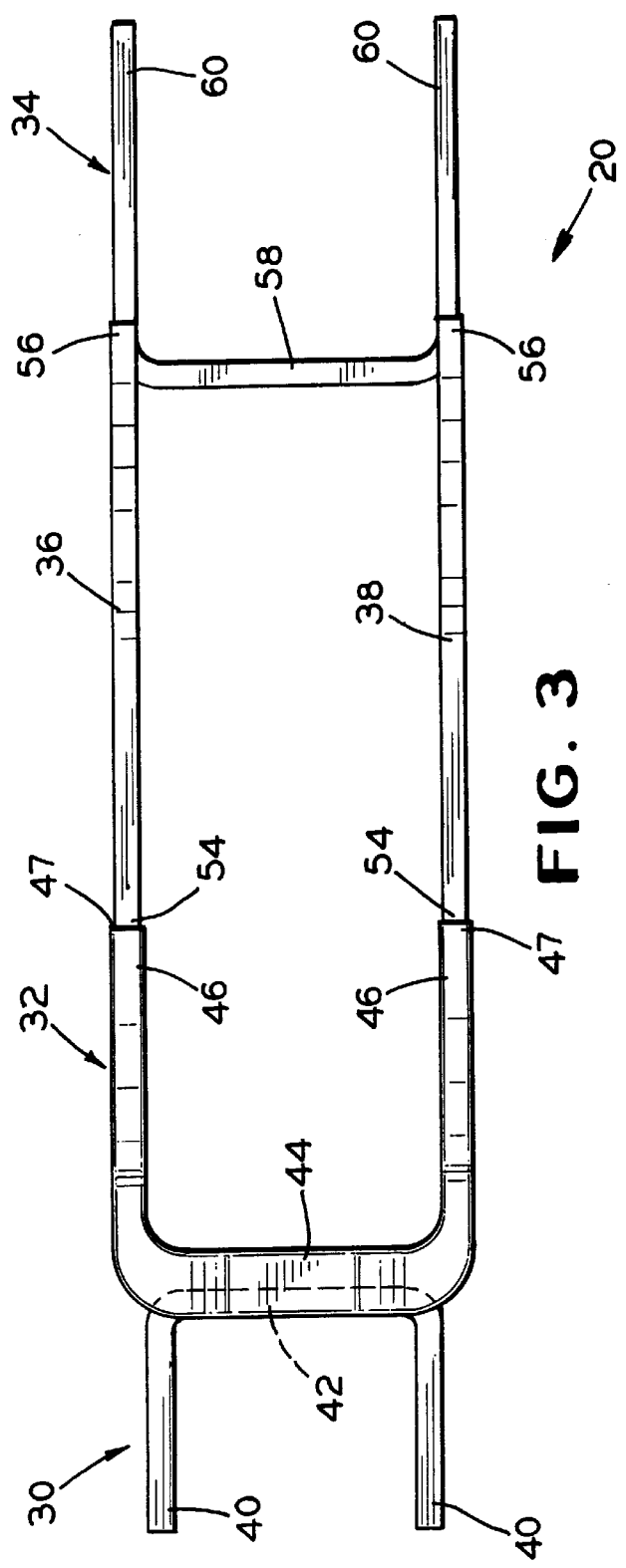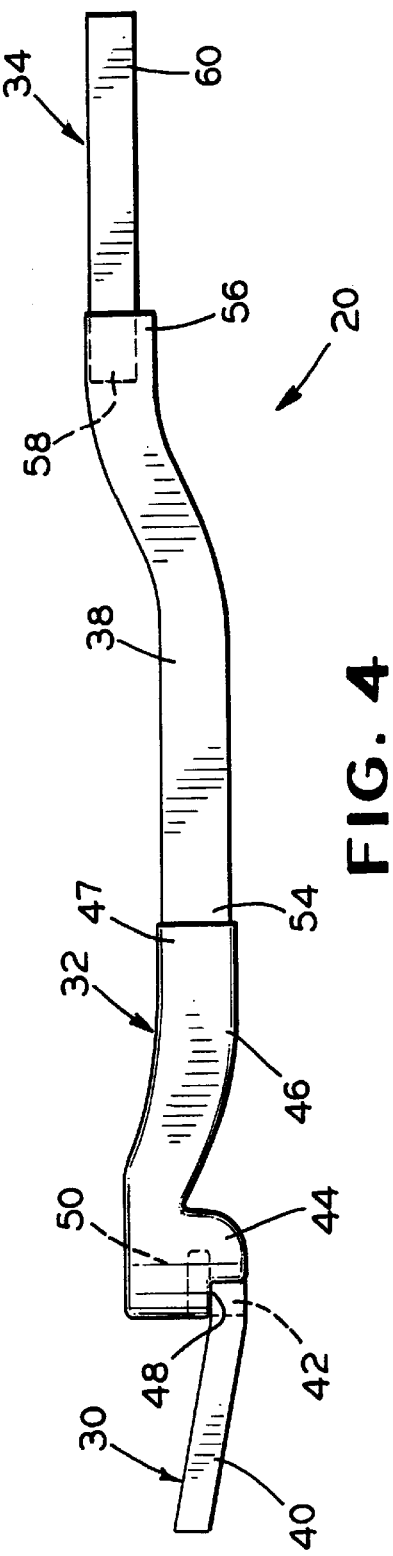

ly at 10, which is conventional in the art. The vehicle frame
MODULAR VEHICLE FRAME ASSEMBLY

BACKGROUND OF THE INVENTION

This invention relates in general to vehicle frame assemblies. In particular, this invention relates to a modular vehicle frame assembly which includes up to three hollow, U-shaped cradle frame subassemblies connected by a pair of open channel side rails.

Virtually all land vehicles in common use, such as automobiles and trucks, include a frame which serves as a platform upon which the remainder of the vehicle is built. Many vehicle frame structures are known in the art. Most of these known vehicle frame structures are formed from a number of individual metallic components which are permanently joined together. For example, a typical perimeter vehicle frame assembly is composed of a pair of longitudinally extending side rails which are joined together at the front by a forward cross member, at the rear by a rearward cross member, and at intermediate locations by one or more intermediate or auxiliary cross members. The cross members not only connect the two side rails together, but also provide desirable lateral and torsional rigidity to the vehicle frame assembly. In some vehicle frame assemblies, the side rails and cross members are formed from open channel structural members, i.e., structural members which have a noncontinuous cross-sectional shape (C-shaped channel members, for example). In other vehicle frame assemblies, the side rails and cross members are formed from closed channel structural members, i.e., structural members which have a continuous cross-sectional shape (box-shaped channel members, for example). Regardless of the specific structure of the structural members, the side rails and cross members, once joined together, form a rigid frame for supporting the remaining portions of the vehicle thereon.

Typically, the cross members extend transversely relative to the two parallel side rails, and the ends of the cross members are permanently secured to the side rails to form a generally rectangular vehicle frame assembly. The cross members are usually secured to the side rails by initially welding brackets to the side rails, then connecting the ends of the cross rails to the brackets by bolts or rivets. The brackets not only support the cross member on the side rails, but also prevent lateral movement of the cross members relative to the side rails. Once the vehicle frame assembly is completed, the remaining components of the vehicle, including the body, drive train, and suspension, can be mounted thereon in a known manner. The side rails for a full perimeter frame structure are typically manufactured to a predetermined length which is appropriate for the particular vehicle. The side rails can be formed as a single member which extends most or all of the length of the vehicle. Alternatively, the side rails can be formed from two or more pieces which are overlapped and then bolted, welded, riveted, or otherwise secured together to form the desired length of the side rail. Once the side rails are made to length, the full perimeter frame is assembled by joining the appropriate number of cross members to the side rails to form a single structure.

It is known that the length of the side rails will vary with different models of vehicles. In addition, it is likely that the number of cross members, and the attachment points of such cross members to the side rails, will also vary for different models of vehicles. In order to produce several different models of full perimeter frame structures on an assembly line, a significant inventory of various side rails and cross members needs to be kept on hand. Maintaining a large inventory of frame assembly parts is both costly and inefficient. Ideally, it would be desirable to provide a modular full perimeter vehicle frame assembly which includes both interchangeable subassemblies and subassemblies which are easily modified for use with a specific vehicle. The use of such a modular vehicle frame assembly would allow more design flexibility while decreasing the amount of inventory required to produce several different models of vehicles.

SUMMARY OF THE INVENTION

This invention relates to a modular full perimeter vehicle frame assembly which may include up to three hollow, U-shaped cradle subassemblies and a pair of closed channel side rails. The modular vehicle frame assembly includes a first generally U-shaped front cradle having a base portion and a pair of spaced-apart leg portions extending forwardly from the base portion. A second generally U-shaped front cradle having a base portion and a pair of spaced-apart leg portions extends rearwardly from the base portion. The second front cradle is secured to the first front cradle. A pair of axially extending side rails are secured to the leg portions of the second front cradle and extend rearwardly therefrom. A third generally U-shaped rear cradle having a base portion and a pair of spaced-apart leg portions extends rearwardly from the base portion. The third rear cradle is secured to the side rails.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a top plan view of the modular vehicle frame assembly illustrated in FIG. 2.

FIG. 4 is a side elevational view of the modular vehicle frame assembly illustrated in FIG. 2.

DETAILED DESCRIPTION OF THE PREFERRED EMBODIMENT

Figure 1:
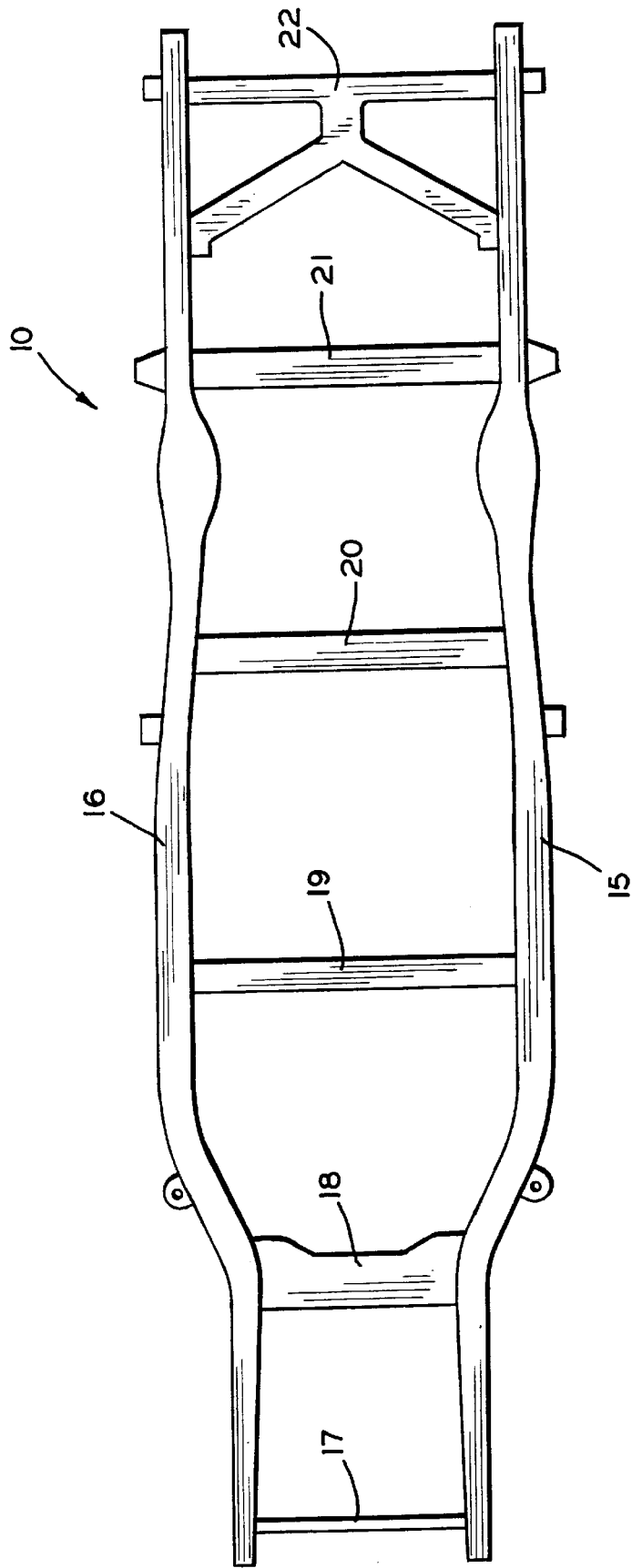
FIG. 1 is a top plan view of a full perimeter vehicle frame which is conventional in the art.

Referring now to the drawings, there is illustrated in FIG. 1 a full perimeter vehicle frame assembly, indicated generally at 10, which is conventional in the art. The vehicle frame assembly 10 includes a pair of axially extending side rails 15 and 16 and a plurality of cross members 17, 18, 19, 20, 21, and 22 which extend between the side rails 15 and 16. The side rails 15 and 16 extend axially along most or all of the length of the vehicle. The cross members 17 through 22 extend in a generally transverse and lateral direction between the two side rails 15 and 16 and are spaced apart from one another. As used herein, the terms "axial", "lateral", "inner", "outer", and their derivatives refer to the orientation of the vehicle as a whole. Therefore, the term "axial" and its derivatives implies a direction which extends along the length of the vehicle from the front of the vehicle to the rear of the vehicle. Similarly, the term "lateral" and its derivatives as used herein refers to a direction which extends from side to side of the vehicle. In addition, the terms "inner", "inward", or "inboard" refer to components located inside or adjacent to the inside of the full perimeter frame while "outer", "outward", and "outboard" refer to components located outside or adjacent to the outside of the fall perimeter frame.

The side rails 15 and 16 may each be formed from a single piece of material. Alternatively, the side rails 15 and 16 may each be formed from two or more pieces which are joined together by bolts, rivets, welds, or any other suitable fastening means to form the desired length of the side rails 15 and 16. Typically, the side rails 15 and 16 are made having a box-shaped or a generally C-shaped cross section. In addition, one or more portions of the side rails 15 and 16 may have one cross-sectional shape while the remaining portions have a different cross-sectional shape.

The cross members 17 through 22 are shorter beams which extend generally laterally between the side rails 15 and 16 to connect them together. As shown in FIG. 1, the cross members 17 through 22 are spaced apart and extend generally parallel with one another. The ends of each cross member 17 through 22 may be secured to the side rails 15 and 16 (or to brackets secured to the side rails 15 and 16) by welding, riveting, bolting, or other suitable means. The shapes of the cross members 17 through 22 may vary widely depending on a number of factors. These factors include the types of loads, if any, the cross member may be supporting and the location where the cross member is attached to the side rails 15 and 16. Typical cross-sectional shapes of the cross members 17 through 22 include rectangular, square, circular, C-shaped, or H-shaped. Both closed channel and open channel structures are used in making the cross members 17 through 22. The linear shape of the cross member may vary along its length, ranging from generally straight members to members having one or more bends. Usually, both the side rails 15 and 16 and the various cross members 17 through 22 are formed from steel. Other materials suitable for use in making the side rails and cross members include, but are not limited to, aluminum and aluminum alloys, plastics, composites (such as fiber matrix composites), and combinations thereof.

Most vehicle frame assemblies, including the illustrated full perimeter frame structure 10, are usually manufactured on an assembly line. Typically, a pre-formed pair of side rails 15 and 16 is supplied to the assembly line. Next, the various cross members 17 through 22 which have also been pre-formed into their final shape are secured to the side rails 15 and 16. Generally, the entire frame assembly is made as a single unit before any of the other vehicle components are attached thereto. Because the size and shape of both side rails 15 and 16 and the various cross members 17 through 22 are typically designed for only one vehicle model, a large inventory of frame parts needed to be replaced with new parts whenever there was a need to manufacture a different vehicle model.

Figure 2:
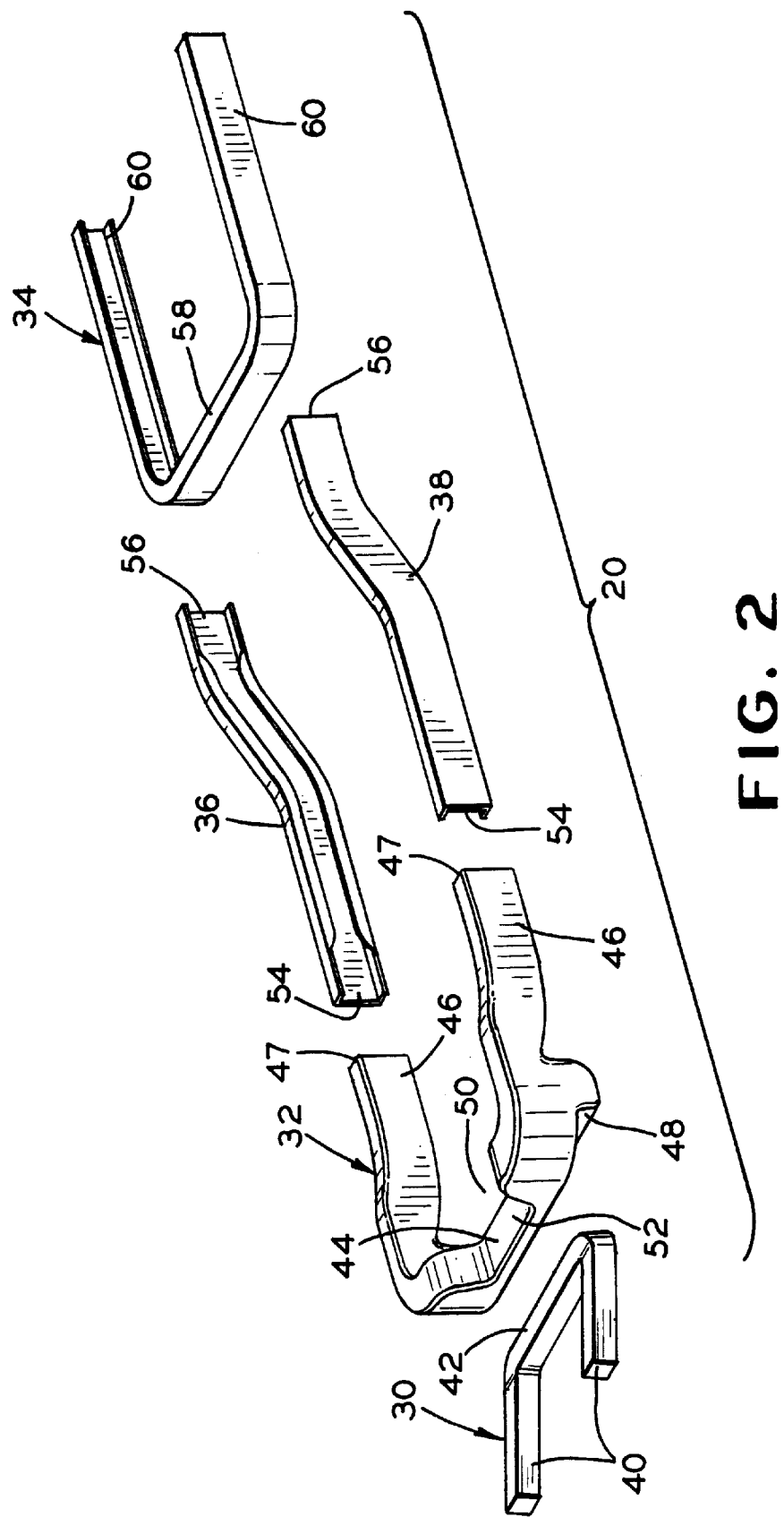
FIG. 2 is an exploded perspective view of a modular full perimeter vehicle frame assembly in accordance with this invention.

A modular full perimeter vehicle frame assembly, indicated generally at 20, in accordance with this invention is shown in FIGS. 2 through 4. As shown in FIG. 2, the modular vehicle frame 20 is composed of three generally U-shaped cradles, indicated generally at 30, 32, and 34. More specifically, the modular vehicle frame assembly 20 includes a first front cradle 30 and a second front cradle 32 which together form the front end portion of the frame assembly 20. A rear cradle 34 forms the rear end portion of the frame assembly 20. Two axially extending side channels 36 and 38 form the center portion of the frame assembly 20 and connect the second front cradle 32 to the rear cradle 34.

The first front cradle 30 includes a pair of spaced-apart, axially extending leg portions 40 which are connected by a transversely extending base portion 42. The first front cradle 30 is oriented such that the legs portions 40 extend forwardly from the base portion 42. The second front cradle 32 also includes a pair of spaced-apart, axially extending leg portions 46 which are connected by a transversely extending base portion 44. In contrast to the first cradle portion 30, the second front cradle 32 is oriented such that the legs portions 46 extend rearwardly from the base portion 44. The base portion 42 of the first front cradle 30 may be secured to the base portion 44 of the second front cradle 32 in any known manner, such as by bolting, riveting, welding, bonding, and the like. As best shown in FIG. 4, the base portion 42 of the first front cradle 30 may be received in a recess 48 formed in the lower edge of the base portion 44 of the second front cradle 32. In this configuration, the first front cradle 30 may extend upward at an angle relative to the second front cradle 32.

Both the first front cradle 30 and the second front cradle 32 may be formed from hollow closed channel members. The first front cradle 30 and the second front cradle 32 may be pre-formed into their final shape (as shown in FIG. 2 through 4) using any of the known metal forming manufacturing processes, such as stretch bending, roll forming, welding stamped parts, hydroforming, and combinations thereof. In the illustrated embodiment, the first front cradle 30 has a generally square cross section along its pair of legs 40 and its base 42. In a preferred embodiment, the first front cradle 30 may be made by stretch bending square stock.

As best shown in FIGS. 2 and 4, the second front cradle 32 may have a more complex shape. More specifically, the second front cradle 32 may include a second recess 50 formed in the upper edge of its base portion 44, in addition to the first recess 48 formed in the lower edge of the base portion 44. This second recess 50 forms a generally flat surface 52 which may be used to support an engine (not shown) or other component of the vehicle. Because of its complex shape, the second front cradle 32 is an excellent candidate for being made by the process of hydroforming. In general, the process of hydroforming (otherwise referred to as "expansion shaping") involves placing a deformable hollow member in a die, then expanding the member into the size and shape of the die by the application of a pressurized fluid internally within the hollow member. More specifically, the deformable hollow member is usually metallic stock material, such as tubular stock, square stock, or sheet material. The apparatus used in a hydroforming process is similar to conventional dies and typically includes two or more die halves which together form a die cavity having the desired size and shape of the final product. The die cavity of a hydroforming apparatus can be designed to have any shape and size. Therefore, the hydroforming process is especially advantageous for manufacturing complex shaped products. In a preferred embodiment of the invention, the second front cradle 32 is made by the process of hydroforming.

As mentioned above, the center section of the modular vehicle frame assembly 20 includes the pair of spaced-apart side rails 36 and 38. In the illustrated embodiment, the side rails 36 and 38 are open channel members having a generally C-shaped cross section. When the modular frame assembly 20 is assembled, each side rail 36 and 38 is oriented such that its C-shaped cross section opens into the interior of the frame assembly 20. Each side rail 36 and 38 includes a first end 54 and a second end 56. The first ends 54 are sized and shaped to allow the side rails 36 and 38 to be received in one of the closed channel ends 47 of each arm 46 of the second front cradle 32. The second ends 56 are sized and shaped to allow the side rails 36 and 38 to fit over the third rear cradle 34 at the intersection of each arm 60 with a base portion 58 of the third rear cradle 34. The side rails 36 and 38 may be secured to the second front cradle 32 and the third rear cradle 34 by any of the conventional attachment means including, but not limited to, welding, bolting, riveting, bonding, or the use of a press fit relationship. The axial length of the side rails 36 and 38 may be varied to accommodate the different wheel bases of various vehicle models. In a preferred embodiment of the invention, the side rails 36 and 38 are made by the process of roll forming.

The rear end portion of the modular vehicle frame assembly 20 includes the third U-shaped rear cradle 34. The third rear cradle subassembly 34 includes a pair of spaced-apart, axially extending leg portions 60 which are connected by a transversely extending base portion 58. The third rear cradle 34 is oriented such that the leg portions 50 extend rearwardly from the base portion 58. In the illustrated embodiment, the third rear cradle 34 may be an open channel member having a generally C-shaped cross section. Preferably, the third rear cradle 34 is made by the process of hydroforming or roll forming.

The use of the four separate pre-formed subassembly frame parts (i.e., the cradles 30, 32, 34 and the pair of side rails 36 and 38) allows more flexibility in designing frame assemblies for any number of vehicles. More specifically, as few as one of the subassemblies may be changed to accommodate the particular specifications of a vehicle. As noted above, the length of the side rails 36 and 38 may be varied to accommodate different wheel bases of different models. In addition, the combination of the first front cradle 30 and the second front cradle 32 provides a front end portion of the vehicle frame 20 which is easily adapted to be used with more than one vehicle model. For example, the overall width or length of the first front cradle 30 could be varied while the size and shape of the second front cradle 32 remains the same for a family of vehicle models. Similarly, for vehicle models having different engine configurations, the shape of the second front cradle 32 may be modified to accommodate different sizes of engines and used with the remaining three unmodified subassembly frame parts.

Once the modular vehicle frame 20 is assembled, a number of options are available with respect to attaching brackets or other devices to the frame. For example, a front bracket (not shown) for a lower control arm used in a short and long arm suspension system could be made as an integral part of the hydroformed second front cradle 32. Alternatively, the front bracket for a lower control arm could be secured to the frame 20 between the first front cradle 30 and the second front cradle 32 so as to strengthen this joint. Similarly, a spring seat assembly (not shown) could be secured to the frame 20 at this same location for this same purpose. Finally, a rear spring front bracket (not shown) could be secured to the frame 20 at the joint between each side rail 36 and 38 and the base 58 of the third rear cradle 34.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A modular vehicle frame assembly comprising:
    a first generally U-shaped front cradle having a base portion and a pair of spaced-apart leg portions extending forwardly from said base portion;
    a second generally U-shaped front cradle having a base portion and a pair of spaced-apart leg portions extending rearwardly from said base portion of said second front cradle, said second front cradle being secured to said first front cradle;
    a pair of axially extending side rails secured to said leg portions of said second front cradle and extending rearwardly therefrom; and
    a third generally U-shaped rear cradle having a base portion and a pair of spaced-apart leg portions extending rearwardly from said base portion of said third rear cradle, said third rear cradle being secured to said side rails.

2. The modular vehicle frame assembly defined in claim 1 wherein said second cradle has a recess formed in said base thereof, and wherein said base of said first cradle is received in said recess.

3. The modular vehicle frame assembly defined in claim 1 wherein said first cradle extends upward at an angle relative to the second cradle.

4. The modular vehicle frame assembly defined in claim 1 wherein said second cradle has a first recess formed in a lower portion of said base thereof, said base of said first cradle being received in said first recess, and wherein said second cradle has a second recess formed in an upper portion of said base thereof.

5. The modular vehicle frame assembly defined in claim 1 wherein said first cradle is formed from a single piece of material.

6. The modular vehicle frame assembly defined in claim 1 wherein said second cradle is formed from a single piece of material.

7. The modular vehicle frame assembly defined in claim 1 wherein said third cradle is formed from a single piece of material.

8. The modular vehicle frame assembly defined in claim 1 wherein each of said side rails is formed having a generally C-shaped cross section.

9. The modular vehicle frame assembly defined in claim 1 wherein said third cradle is formed having a generally C-shaped cross section.

* * * * *